(12) United States Patent
Doss (10) Patent No.: US 10,137,604 B2
(45) Date of Patent: Nov. 27, 2018

(54) MOLD FOR CREATING NEGATIVE DRAFT SURFACES IN MOLDED ITEMS AND METHOD OF MOLDING

(71) Applicant: Raymond Doss, Leesburg, IN (US)

(72) Inventor: Raymond Doss, Leesburg, IN (US)

( * ) Notice: Subject to any disclaimer, the term of this patent is extended or adjusted under 35 U.S.C. 154(b) by 617 days.

(21) Appl. No.: 14/918,867

(22) Filed: Oct. 21, 2015

(65) Prior Publication Data
US 2016/0039125 A1    Feb. 11, 2016

Related U.S. Application Data

(63) Continuation of application No. 13/436,467, filed on Mar. 30, 2012, now Pat. No. 9,321,191.

(51) Int. Cl.
| | |
|---|---|
| *B29C 33/42* | (2006.01) |
| *B29C 33/44* | (2006.01) |
| *B29C 41/02* | (2006.01) |
| *B29C 41/38* | (2006.01) |
| *B29C 41/42* | (2006.01) |
| *B29L 31/00* | (2006.01) |
| *B29C 33/40* | (2006.01) |

(52) U.S. Cl.
CPC .............. *B29C 33/42* (2013.01); *B29C 33/44* (2013.01); *B29C 41/02* (2013.01); *B29C 41/386* (2013.01); *B29C 41/42* (2013.01); *B29C 33/40* (2013.01); *B29L 2031/7692* (2013.01)

(58) Field of Classification Search
CPC ....... B29C 39/34; B29C 41/386; B29C 43/42; B29C 44/582; B29C 2043/5023; B29C 45/4407; B29C 45/4478; B29C 2045/4492; B29C 45/4421; B29C 49/54; B29C 33/44; B29C 33/42
See application file for complete search history.

(56) References Cited

U.S. PATENT DOCUMENTS

| | | | |
|---|---|---|---|
| 2,714,226 A | | 8/1955 | Axelrad |
| 3,088,124 A | | 5/1963 | Long |
| 3,307,729 A | | 3/1967 | Schwartz |
| 3,494,509 A | | 2/1970 | McGuire |
| 3,941,247 A | | 3/1976 | Cripe |
| 4,170,292 A | | 10/1979 | Kuether |
| D277,695 S | * | 2/1985 | Blodee .......................... D23/275 |

(Continued)

OTHER PUBLICATIONS

Design Drawing Print by Accessibility Professionals Dated Revised Jan. 4, 2012, unknown if/when published or produced.

(Continued)

*Primary Examiner* — Monica A Huson
*Assistant Examiner* — Kelsey C Grace (57) ABSTRACT

A one-piece mold can be used to form molded items that incorporate features or encroachments with negative draft angles, and such molded items can be removed from the mold in a single piece by lifting, tilting, or pulling, or a combination thereof, without breaking the mold or the item to be molded. The mold and method of molding are suited to a bathtub or shower unit. The mold and method of molding permit the removal of molded items with negative draft angles by coordinating the angle of the sump front will and sump back wall with the angles of other encroachments in the molded item within specified ranges that permit one-piece removal of the item to be molded from the mold.

8 Claims, 6 Drawing Sheets

(56) References Cited

U.S. PATENT DOCUMENTS

| | | |
|---|---|---|
| D310,557 S | 9/1990 | Smith |
| 5,027,963 A | 7/1991 | Robbins |
| 5,741,453 A | 4/1998 | Kennedy |
| 6,135,324 A | 10/2000 | Schmitt |
| 6,895,609 B2 | 5/2005 | Ingram et al. |
| 6,901,640 B2 | 6/2005 | Sevey |
| 2004/0089965 A1 | 5/2004 | Malifliet |
| 2005/0276941 A1 | 12/2005 | Kapelanski et al. |
| 2007/0289979 A1 | 12/2007 | Jean |
| 2011/0011549 A1 | 1/2011 | Pierce et al. |
| 2012/0055834 A1 | 3/2012 | Hay et al. |

OTHER PUBLICATIONS

Design Drawing Print Caml Tomlin ICON 9100L Dated Sep. 10, 2007, uknown if/when published or produced.
Advisory Action dated Oct. 5, 2015 in U.S. Appl. No. 13/436,467.
Final Rejection dated Apr. 28, 2015 in U.S. Appl. No. 13/436,467.
Non-final rejection dated Oct. 1, 2014 in U.S. Appl. No. 13/436,467.

\* cited by examiner

MOLD FOR CREATING NEGATIVE DRAFT SURFACES IN MOLDED ITEMS AND METHOD OF MOLDING

CROSS-REFERENCES TO RELATED APPLICATIONS

This application is a continuation of, and claims priority to, U.S. patent application Ser. No. 13/436,467, Mold for Creating Negative Draft Surfaces in Molded Items and Method of Molding, by Raymond Doss, filed Mar. 30, 2012, and same is incorporated, by reference herein.

STATEMENT REGARDING FEDERALLY SPONSORED RESEARCH OR DEVELOPMENT

Not applicable.

BACKGROUND

The present invention relates to a one-piece mold for forming a bathing unit that comprises as a single piece a bathtub and bathtub surround or a single-piece shower and shower surround, with such mold forming encroachments within the bathing unit that incorporate negative draft angles. The present invention further relates to a method of molding such a bathing unit.

Molded bathing units that comprise as a single piece a bathtub and bathtub surround or shower and shower surround are preferable to bathing units molded or formed from two or more separate pieces. Bathing units molded as a single piece are typically more economical to produce and often have superior structural and design characteristics for certain applications. Specifically, such bathing units are ideal for use in space-limited areas, such as the bathroom of a recreational vehicle.

Typically, one-piece molds for bathing units are configured so that encroachments molded into the bathing unit incorporate positive draft angles. It has long been believed in the art that avoiding negative draft angles in the mold and item to be molded is necessary to permit the molded item to be removed from the mold without breaking the molded item or the mold. Using molds and methods of molding known in the art, forming an encroachment with a negative draft angle in a molded item would require either the use of a two-piece mold, or the breaking or cutting of the molded item to enable removal of the item from the mold.

Figure 2:
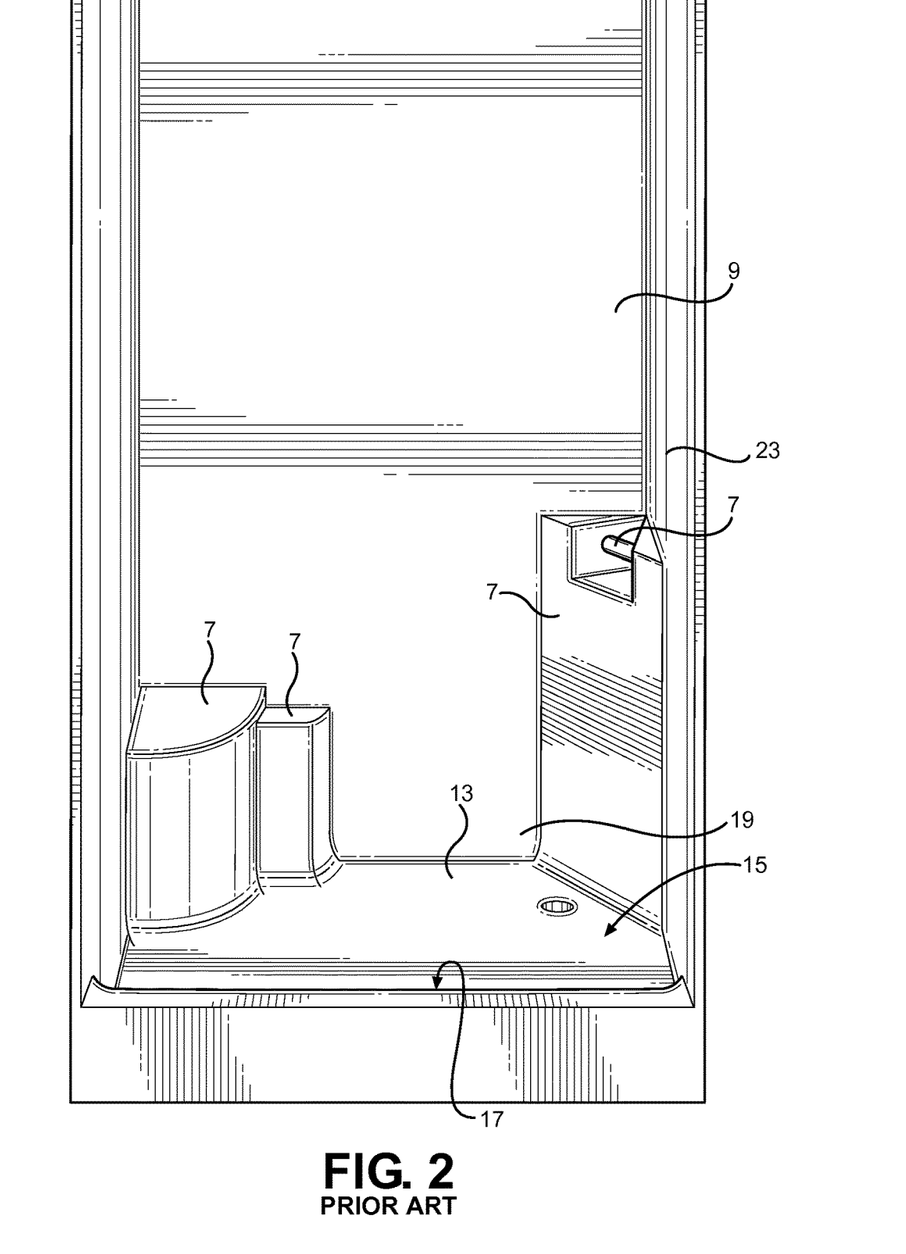
FIG. 2 is a front view of a bathing unit formed according to a mold and method of molding known to the art and incorporating only encroachments with positive draft angles.

The inability of one-piece molds and methods of molding known to the art to accommodate encroachments with negative draft angles significantly limits the design features possible for bathing units formed by such molds and methods of molding. To avoid negative draft angles, molds and methods of molding known to the art form each encroachment in a bathing unit as a "pillar" running at a positive draft angle from the floor of the bathing unit to the height desired for the feature. Seats, benches, shelves, soap dishes, sump walls, and other encroachments within a bathing unit are typically funned by the upper face of such "pillars," as shown in FIG. 2. This configuration permits removal of the bathing unit from the mold. However, the necessity of forming a pillar extending to the floor of the bathing unit to accompany each desired encroachment reduces the space available to the user within the unit, and specifically reduces floorspace available to the user.

As a result, molds and methods of molding known to the art typically limit the number and size of encroachments—and thus, the number and size of features such as seats, shelves, benches, and dishes within such bathing units—to preserve space and floorspace within the unit. Further, molds and methods of molding known to the art cannot easily incorporate encroachments directly above or directly below other encroachments because of the difficulty of forming a positive draft angle for all but the lowermost encroachment. This significantly limits the design possibilities of bathing units formed by molds and methods of molding known to the art.

Accordingly, it is desirable to provide a one-piece mold and method of molding using a one-piece mold that is capable of producing an item, with encroachments that incorporate negative draft angles, that can be removed from the mold in a single piece without breaking the mold or the item. Preferably, such item is a bathing unit.

SUMMARY OF THE INVENTION

These and other objects are achieved by the present invention, which provides a one-piece mold capable of forming as bathing unit that comprises, as a single piece, a bathtub and tub surround or shower and shower surround, with encroachments within the unit that incorporate negative draft angles, that can be removed from the mold in a single piece without breaking the mold or the bathing unit. The present invention further provides a method of molding the same.

A mold according to versions of the present invention is can be made from any of a wide range of materials known to those skilled in the relevant art. The mold can be made substantially from a nonstick material, can be coated with such a material, or, alternately, the mold or item to be molded can be treated with a release agent appropriate to allow the material to be molded to be removed from the mold after hardening.

The mold is configured to form an item to be molded as a rigid shell in a desired shape, which shape includes desired encroachments formed by the contours of the mold. Preferably, the item to be molded is a bathing unit, and such encroachments comprise features such as shelves, seats, benches, sump walls, or dishes. The mold is configured to form sump walls and encroachments with draft angles coordinated within specified ranges such that the item to be molded can be removed from the mold by pulling, tilting, or lifting, or some combination thereof, without breaking the mold or the item to be molded.

A method of molding according to versions of the present invention employs a single-piece mold as described herein. The material intended to form the item to be molded is applied to the mold by pouring, spraying, painting, rolling, or other means of application. The material is allowed to dry, cure, or otherwise hardens. After the material hardens substantially, the item is removed from the mold by pulling, tilting, lifting, or some combination thereof. Due to the coordination of angles of the sump walls and encroachments formed by the mold, the molded item can be removed in a single piece from the mold by pulling, tilting, or lifting, or some combination thereof, without breaking the mold or the item to be molded.

For a more complete description of the present invention, reference is made to the following description, figures, and claims. It will be appreciated by one skilled in the art that the mold and method of molding of this invention are not limited to specific items to be molded, to specific materials from which the mold is formed, or to specific materials from which the item is formed.

DESCRIPTION OF THE INVENTION

Figure 1:
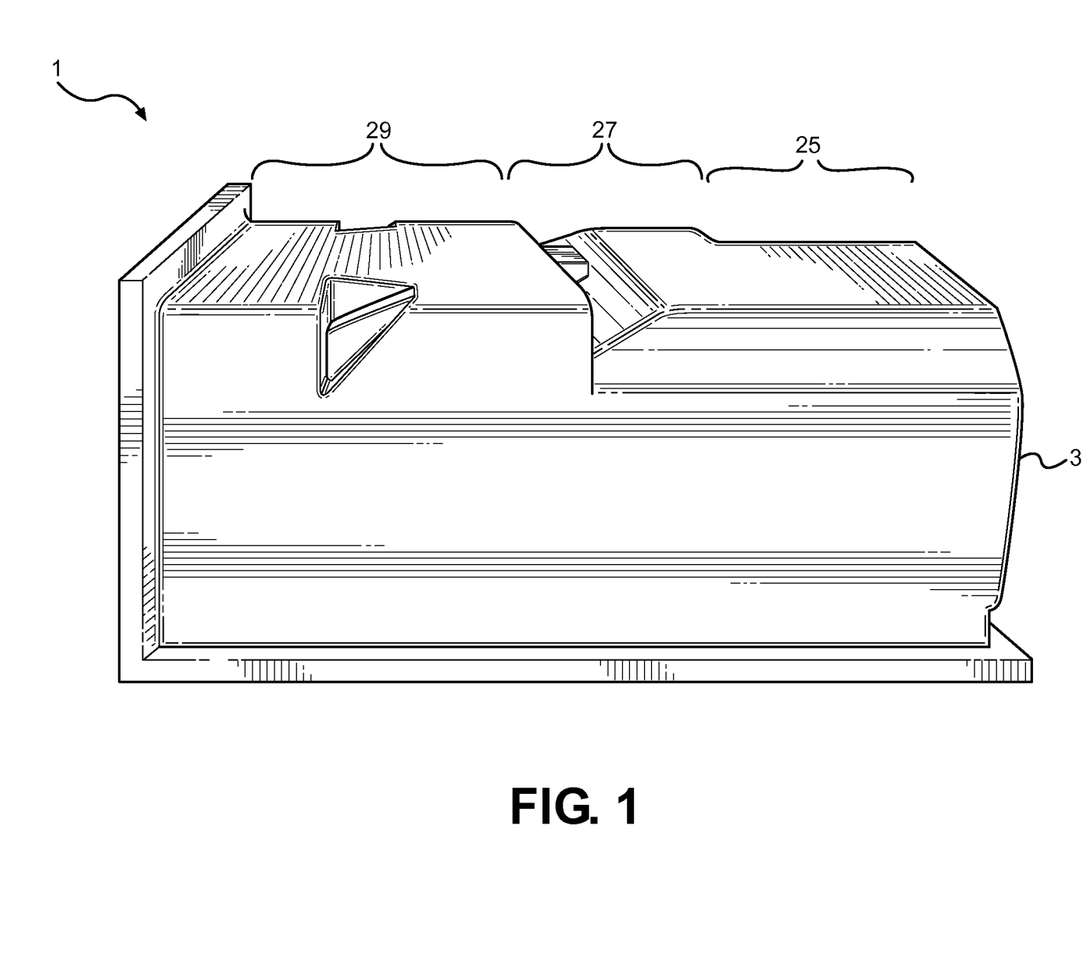
FIG. 1 is a perspective view of a mold according to a version of the present invention.

A mold [1] according to versions of the present invention is shown in FIG. 1. The mold [1] is a single-piece mold that is formed from any of a wide range of materials known to those skilled in the relevant art. The mold [1] can be made substantially from a nonstick material, can be coated with such a material, or, alternately, the mold [1] or item to be molded can be treated with a release agent appropriate to allow the material to be molded to be removed from the mold [1] after hardening.

A mold [1] according. to versions of the present invention is comprised of a base [3] and walls [5] connected to said base [3]. The base [3] and walls [5] of the mold [1] are configured so that when material to be molded is applied to the mold [1], then substantially hardens, and is then removed from the mold [1] in the general direction of the base [3] of the mold, also known as the direction of pull, the finish side of the molded item will comprise substantially the shape determined by the contours of the mold [1]. Preferably, the base [3] and walls [5] of the mold are configured so that when material to be molded is applied to the mold, substantially hardens, and is removed from the mold, a bathing unit that includes encroachments [7] is formed. Preferably, the bathing unit so formed will be a single piece comprising a bathtub and bathtub surround, or a single piece comprising a shower and shower surround, and at least some of the encroachments [7] therein will incorporate negative draft angles according to the teachings of the present invention. "Bathing unit," as that term is used herein, comprises both bathtub and shower units.

The item formed by the mold [1] and method of molding according to versions of the present invention is formed as a substantially rigid shell with a finish side [9] and a non-finish side [11]. The finish side [9] of the molded item is the face of the item that, during the application and hardening phase of the molding process, remains substantially in contact with the mold [1]. The non-finish side [11] of the molded item is the face of the molded item that, during the hardening phase of the molding process, is facing substantially outward from the surface of the mold [11].

Figure 3:
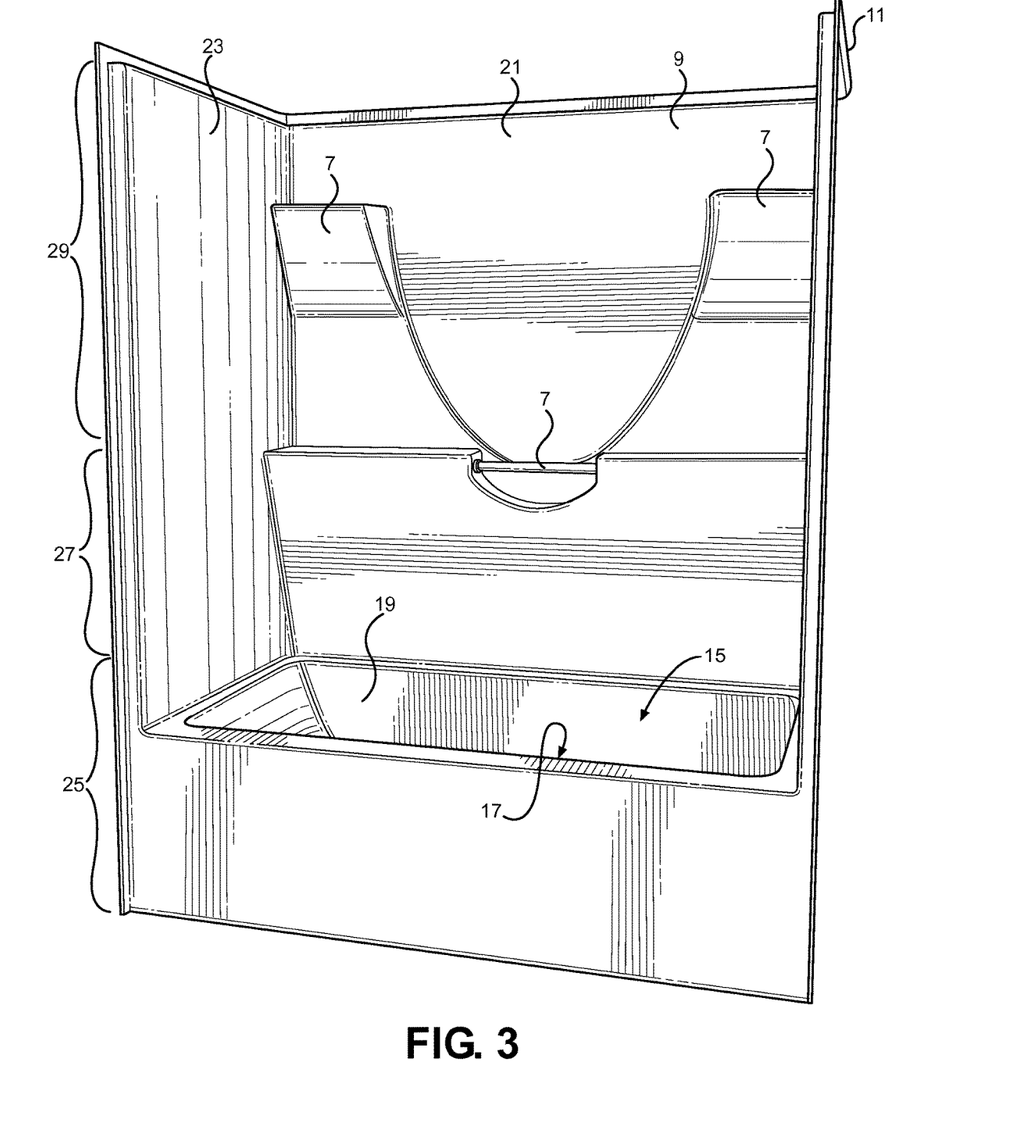
FIG. 3 is a front view of a bathtub unit formed according to a mold and method of molding of the present invention, incorporating encroachments with negative draft angles.
Figure 4:
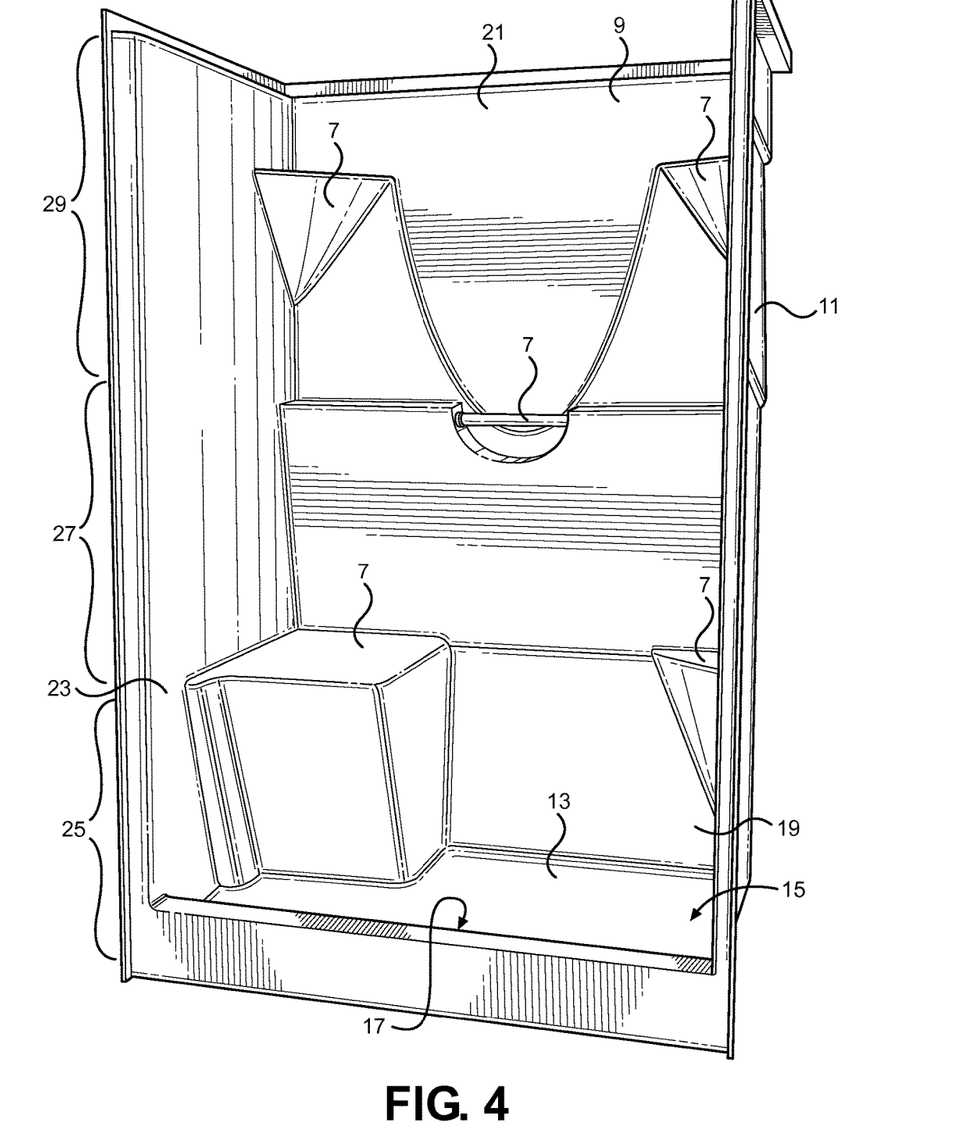
FIG. 4 is a front view of a shower unit formed according to a mold and method of molding of the present invention, incorporating encroachments with negative draft angles.

Preferably, the item to be molded is a bathing unit. As shown in FIGS. 3 and 4, the finish side [9] of the bathing unit formed according to the teachings of the present invention comprises interior faces of the bathing unit that would be visible to a user during use of the bathing unit. Such faces, by way of illustration, comprise a floor [13], a sump [15] in which a user would stand or bathe, a sump front wall [17], a sump back wall [19], a unit back wall [21], and, optionally, unit side walls [23].

The non-finish side [11] of the bathing unit comprises the exterior laces of the unit. The non-finish side [11] of a bathing unit would not typically be visible to a user using the bathing unit, as such non-finish side [11] is typically concealed by framing, plumbing, or other structures.

The finish side [9] of a molded item will be referred to as the "inward" surface of the item, and the non-finish side [11] will be referred to as the "outward" surface thereof. The direction of the item formed by the base [3] of the mold [1] will be referred to as "downward," and the direction opposite the base [3] of the mold [1] will be referred to as "upward."

The item to be molded according to versions of the present invention can be made of any material suitable for molding on or in a one-piece mold [1]. Preferably, such materials will be selected such that when the material has hardened, it will have structural properties suitable for the intended use of the item. Suitable materials include those that can be formed, converted, suspended, or included in fluid matter appropriate for application to a mold [1], such as liquids, foams, gels, or sprays, and then, after application, can be dried, cured, or hardened such that the material forms as shell that can be removed from the mold [1]. Such drying, curing, or hardening process will be referred to as "hardening."

It will be recognized by those skilled in the art that the molding process may involve chemical or physical changes to the material being molded with or without dehydration and with or without the application of heat. Appropriate materials include fiberglass, thermoplastics, and other polymers. Other materials appropriate for use will be apparent to one skilled in the art.

A mold [1] according to versions of the present invention is configured to form encroachments [7] in the item to be molded. "Encroachments" as used herein means any fixture, feature, or design element that is formed by the shape or contour of the mold [1]. Preferably, encroachments [7] comprise features desirable in bathing units such as seats, benches, ledges, shelves, dishes, and sump walls. It will be appreciated that other encroachments [7] are within the scope of the teachings of the present invention.

Figure 6:
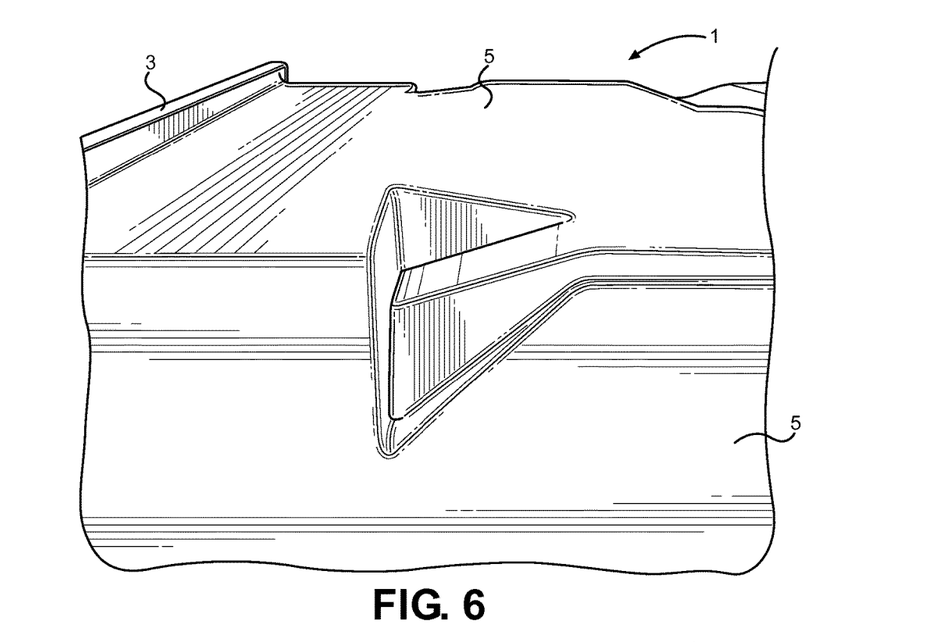
FIG. 6 is an enlarged view of a portion of a mold according to teachings of the present invention configured to form a negative draft encroachment.
Figure 7:
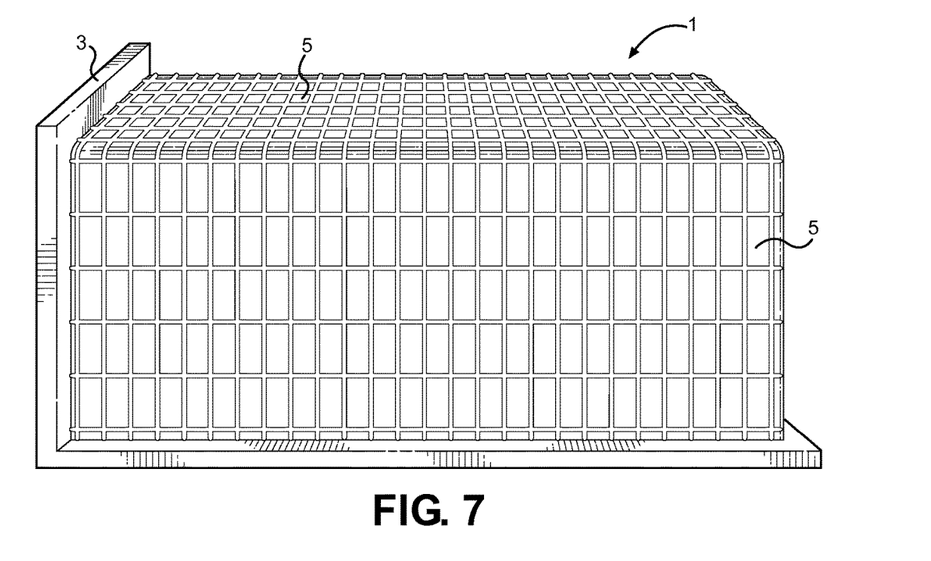
FIG. 7 is a side view of a mold according to the prior art.

A mold [1] according to versions of the present invention utilizes variations in the shape or contour of the mold walls [5] or mold base [3] to form encroachments [7] in a molded item. By way of illustration, a depression in the wall [5] of a mold [1] may be used to form an encroachment [7] in the item to be molded. FIG. 6 demonstrates a portion of a mold configured to form a negative draft encroachment in a molded bathing unit.

Versions of the present invention can form molded items incorporating encroachments [7] with negative draft angles that can be removed from the mold [1] without breaking the mold [1] or the molded item. FIGS. 3 and 4 show a bathtub unit and shower unit, respectively, formed according to the teachings of a version of the invention herein.

"Positive draft" and "negative draft" angles of are defined in terms of the mold surface and the direction of pull for removal of items formed on the mold. In the case of a mold for a bathing unit, for example, the wall [5] of the mold [1] that forms the unit back wall [21] is typically the upper surface of the mold, and the direction of pull is in the direction of the base [3]. "Positive draft" angles are those angles that create a surface that slopes away in the direction of pull from a theoretical horizontal axis lying atop the outermost portion of said mold back wall, such that portions of the angled surface located further towards the direction of pull are more distant from said horizontal axis than portions of said angled surface located further opposite the direction of pull. "Negative draft" angles are those angles that create a surface that slopes away opposite the direction of pull from a theoretical horizontal axis lying atop the outermost portion of said mold back wall, such that portions of the angled surface more removed from the direction of pull are more distant from said horizontal axis than portions of the angled surface further towards the direction of pull. The magnitude of the angle of draft is measured with reference to said theoretical hypothetical axis.

Figure 5:
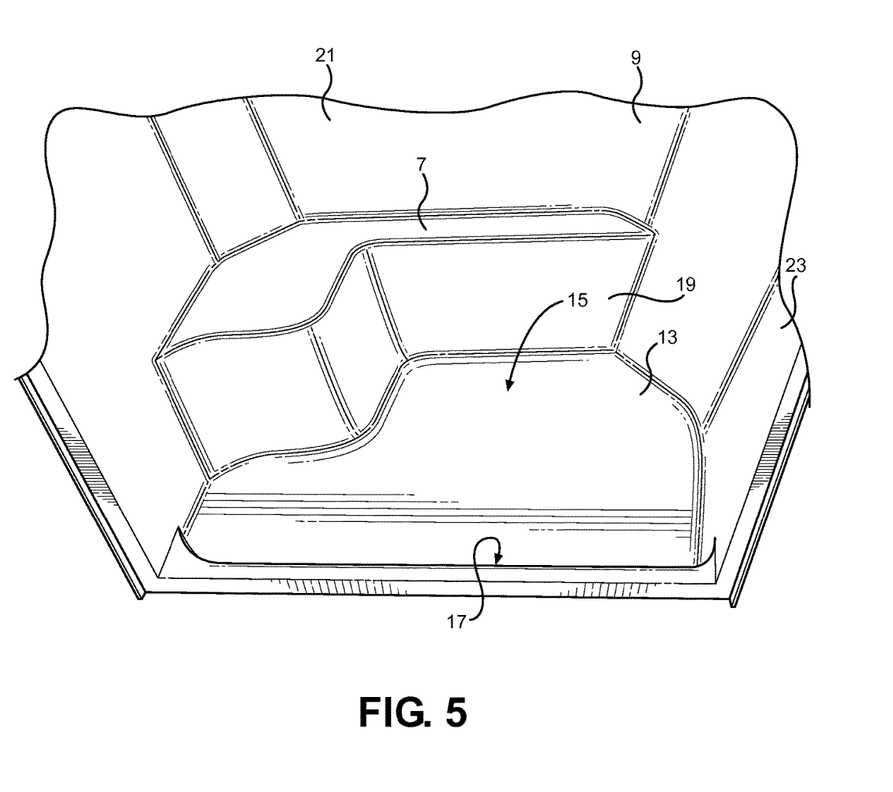
FIG. 5 is an enlarged view of an encroachment incorporating a negative draft angle formed according to the teachings oldie present invention.

The negative draft angle of encroachments [7] formed by the mold and method of molding of the versions of the invention herein permit encroachments [7] to be incorporated in the molded item without the need for forming a pillar running downwardly from each encroachment [7], as is typically required by positive draft encroachments. FIG. 5 shows an enlarged view of a bench encroachment incorporating a negative draft angle according to the teachings of the present invention.

Preferably, as used in connection with a bathing unit, the teachings of versions of the present invention permit seats or benches to incorporate a negative draft angle, resulting in a reduction in the amount of floorspace occupied thereby. Versions of the present invention further permit shelves, dishes, and sump front walls [17] to incorporate a negative draft angle, resulting in an increase in the space and floorspace available in the portions of the bathing unit under the encroachment [7]. Versions of the present invention further permit multiple encroachments to be positioned vertically above or beneath each other without reducing the amount of space or floorspace available wider the lowermost encroachment.

The teachings of the present invention include configuring a mold [1] for a bathing unit so as to coordinate within specified ranges the draft angles of the sump front wall [17] and sump back [19] with the draft angles of other encroachments [17] within the unit. The range of draft angles permitted for any particular encroachment [7] is a function of the depth of the sump [15] and the distance of the encroachment [7] from the floor [13] of the unit. Configuring as mold [1] to form encroachments [7] incorporating draft angles within appropriate ranges for particular sump [15] depths and particular heights of encroachment [7] permits the bathing unit to be removed from the mold [1] in a single piece without breaking the mold [1] or the bathing unit, according to the teachings of this invention.

A mold according to a preferred bathing unit embodiment of this invention is divided into three zones: a sump zone [25], a middle zone [27], and an upper zone [29]. The sump zone [25] is that part of the mold [1] that forms the portion of the bathing unit extending from the floor [13] of the unit upwards to approximately top of the sump front wall [17]. The middle zone [27] is that part of the mold [1] forming the portion of the item to be molded extending the top of the sump zone [25] to approximately one half of the distance between the top of the sump zone [25] and the proximal end of the bathing unit furthest from the floor [13]. The upper zone [29] is that part of the mold [1] forming the portion of the item to be molded extending from the top of the middle one [27] proximal end of the bathing unit furthest from the floor [13]. It will be appreciated that the size of each zone with respect to the other zones will vary as function of the overall height of the unit and the dimensions of the sump [15]. It will further be appreciated that the teachings of this invention can be accomplished with use of more or fewer zones than specified in the embodiments described herein.

As related to a preferred embodiment of a bathtub unit as shown in FIG. 3, the configuration of as mold [1] according to versions of the present invention is as follows:

The portion of the mold [1] that that forms the sump front wall [17] is configured to form a negative draft angle of approximately 10 degrees, and the portion of the mold [1] that forms the sump back wall [19] configured to form a negative draft angle of a magnitude not greater than the magnitude of the angle of the sump front wall, preferably not exceeding 8 degrees;

Portions of the mold [1] that form encroachments [7] in the sump zone [25] other than the sump back wall [19] are configured to form such encroachments [7] with a negative draft angle with a magnitude of angle not exceeding the magnitude of angle of the sump front wall [17], such negative draft angle preferably not exceeding approximately 8 degrees;

Portions of the mold [1] that form encroachments in the middle zone [27] are configured to form such encroachments [7] incorporating a negative draft angle not exceeding approximately 40 degrees; and Portions of the mold [1] that form encroachments [7] in the upper zone [29] are configured to form such encroachments [7] incorporating a negative draft angle not exceeding approximately 45 degrees.

As related to a preferred embodiment of a shower unit, as shown in FIG. 4, the configuration of a mold [1] according to versions of the present invention is as follows:

The portion of the mold [1] that forms the sump front wall [17] is configured to form a negative draft angle of approximately 30 degrees, and the portion of the mold [1] that forms the sump back wall [19] is configured to form a negative draft angle of a magnitude not greater than the magnitude of the angle of the sump front wall, preferably not exceeding approximately 25 degrees;

Portions of the mold [1] that form encroachments [7] in the sump zone other than the sump back wall [19] are configured to form such encroachments [7] incorporating a negative draft angle with a magnitude of angle not exceeding the magnitude of angle of the sump front wall [17], such negative draft angle preferably not exceeding approximately 25 degrees;

Portions of the mold [1] that form encroachments [7] in the middle zone [27] are configured to form such encroachments [7] incorporating a negative draft angle not exceeding approximately 40 degrees; and Portions of the mold [1] that form encroachments [7] in the upper zone [29] are configured to form such encroachments [7] incorporating a negative draft angle not exceeding approximately 45 degrees.

When a mold [1] is configured according to the teaching of versions of the present invention, it is possible for the molded item to be removed from the mold [1] in one piece, without breaking the mold [1] or the molded item. Removal of the molded item from the mold [1] may be accomplished by pulling, tilting, or lifting the molded item from the mold [1], or by any combination of pulling, tilting, or lifting the molded item from the mold [1].

A method of molding according to versions of the present invention uses a mold [1] described herein and comprises the steps of substantially covering the molding surfaces of the mold [1] with the material to be molded, allowing the material to be molded to dry, cure, or otherwise harden sufficiently to permit the removal of such material from the mold [1], and removing the item formed by such material from the mold [1] by pulling, tilting, or lifting, or any combination of pulling, tilting, or lifting, without breaking the mold [1] or the item.

It will be appreciated by one skilled in the art that the scope of the present invention is not limited to the specific embodiments described herein, and that other embodiments, materials, products, molded items, and encroachment types are within the scope of the present invention.

What is claimed is:

1. A method for molding a bathtub including at least one negative draft angle encroachment within said bathtub, said method comprising the steps of:
   (a) substantially covering the molding surfaces of a one-piece bathtub mold with a material to be molded while said material to be molded is in substantially fluid form, wherein said mold comprises a sump, walls extending beyond said sump, and at least one encroachment, wherein said sump comprises a sump front wall and a sump back wall, and wherein said mold forms said sump front wall to reflect a negative draft angle of approximately 10 degrees and forms said sump back wall to reflect a negative draft angle of a magnitude not greater than the magnitude of the draft angle of said sump front wall, said encroachment comprises at least one of one or more shelves and one or more seats, and wherein at least one said encroachment reflects a draft angle that is negative with respect to a direction of pull parallel to the plane defined by said rear wall;
   (b) allowing said material to harden to substantially solid form such that at least a portion of said material is molded into a bathtub; and
   (c) removing said material from said mold by one or more of:
      a) pulling;
      (b) tilting; or
      (c) lifting
   without breaking said mold or said material.

2. The method of claim 1, in which portions of the mold form at least one encroachment in a sump zone of said bathtub such that said encroachment reflects a negative draft angle of a magnitude not exceeding 2 degrees less than the magnitude of angle of said sump front wall.

3. The method of claim 1, in which portions of the mold form at least one encroachment in a middle zone of said bathtub such that said encroachment reflects a negative draft angle of a magnitude not exceeding approximately 40 degrees.

4. The method of claim 1, in which portions of the mold form at least one encroachment in an upper zone of said bathtub such that said encroachment reflects a negative draft angle of a magnitude not exceeding approximately 45 degrees.

5. A method for molding a shower including at least one negative draft angle encroachment within said shower, said method comprising the steps of:
   (a) substantially covering the molding surfaces of a one-piece shower mold with a material, to be molded while said material to be molded is in substantially fluid form, wherein said mold comprises a sump, walls extending beyond said sump, and at least one encroachment, wherein said sump comprises a sump front wall and a sump back wall, and wherein said mold forms said sump front wall to reflect a negative draft angle of approximately 30 degrees and forms said sump back wall to reflect a negative draft angle of a magnitude not greater than the magnitude of the draft angle of said sump front wall, said encroachment comprises at least one of one or more shelves and one or more seats, and wherein at least one said encroachment reflects a draft angle that is negative with respect to a direction of pull parallel to the plane defined by said rear wall;
   (b) allowing said material to harden to substantially solid form such that at least a portion of said material is molded into a shower; and
   (c) removing said material from said mold by one or more of:
      a) pulling;
      (b) tilting; or
      (c) lifting
   without breaking said mold or said material.

6. The method of claim 5, in which portions of the mold form at least one encroachment in a sump zone of said shower such that said encroachment reflects a negative draft angle of a magnitude not exceeding 5 degrees less than the magnitude of angle of said sump front wall.

7. The method of claim 5, in which portions of the mold form at least one encroachment in a middle zone of said shower such that said encroachment reflects a negative draft angle of a magnitude not exceeding approximately 40 degrees.

8. The method of claim 1, in which portions of the mold form at least one encroachment in an upper zone of said shower such that said encroachment reflects a negative draft angle of a magnitude not exceeding approximately 45 degrees.

* * * * *

UNITED STATES PATENT AND TRADEMARK OFFICE
CERTIFICATE OF CORRECTION

PATENT NO. : 10,137,604 B2  
APPLICATION NO. : 14/918867  
DATED : November 27, 2018  
INVENTOR(S) : Raymond Doss Page 1 of 1

It is certified that error appears in the above-identified patent and that said Letters Patent is hereby corrected as shown below:

On the Title Page

In the Abstract, Line 9, delete "will" and insert --wall--

In the Specification

Column 1, Line 58, delete "funned" and insert --formed--
Column 2, Line 21, delete "as", first occurrence, and insert --a--
Column 3, Line 16, delete "oldie" and insert --of the--
Column 4, Line 6, delete "laces" and insert --faces--
Column 4, Line 27, delete "as" and insert --a--
Column 4, Line 52, after "draft" insert --angle--
Column 5, Line 35, delete "wider" and insert --under--
Column 5, Line 40, after "back" insert --wall--
Column 5, Line 41, delete "[17]" and insert --[7]--
Column 5, Line 51, after "mold" insert --[1]--
Column 5, Line 58, after "extending" insert --from--
Column 5, Line 64, after ""[27]" insert --to the--
Column 5, Line 66, after "as" insert --a--
Column 6, Line 5, delete "as" and insert --a--
Column 6, Line 40, after "zone" insert --[25]--
Column 6, Line 63, after "[1]" insert --as--

Signed and Sealed this  
Third Day of September, 2019

Andrei Iancu  
*Director of the United States Patent and Trademark Office*